United States Patent [19]
Martinez

[11] 3,721,261
[45] March 20, 1973

[54] TEMPERATURE AND WATER DISTRIBUTION REGULATING MECHANISM FOR BATHTUBS AND WASHBASINS

[76] Inventor: Ildefonso Martinez, Miami, Fla.

[22] Filed: May 17, 1971

[21] Appl. No.: 145,075

Related U.S. Application Data

[63] Continuation-in-part of Ser. No. 837,762, June 30, 1969, abandoned.

[52] U.S. Cl. ............137/597, 137/625.4, 137/625.47
[51] Int. Cl. .................................................F16k 19/00
[58] Field of Search.................137/597, 625.4, 625.5; 251/266

[56] References Cited

UNITED STATES PATENTS 168,824  10/1875  Barton..................................251/266
1,855,359  4/1932  McNamara.....................137/625.4 X
1,856,380  5/1932  Foster..................................137/597
1,931,392  10/1933  Otwell.............................137/597 X
3,194,264  7/1965  Greco............................137/625.4 X Primary Examiner—Robert G. Nilson
Attorney—Lloyd J. Andres

[57] ABSTRACT

A water control device having a manual control for selectively mixing and dispensing quantities of hot and cold pressurized water to a predetermined desired temperature within the temperature range of the hot and cold water and conducting same into a distribution cylinder controlled by a second manual control which may be adjusted from an "off" position to conduct the water to and from a spout for tube use or conduct the water to and from a shower heat at the aforesaid desired temperature.

5 Claims, 10 Drawing Figures

INVENTOR.
ILDEFONSO MARTINEZ
BY
Lloyd J Andres

INVENTOR.
ILDEFONSO MARTINEZ
BY Lloyd J Andres

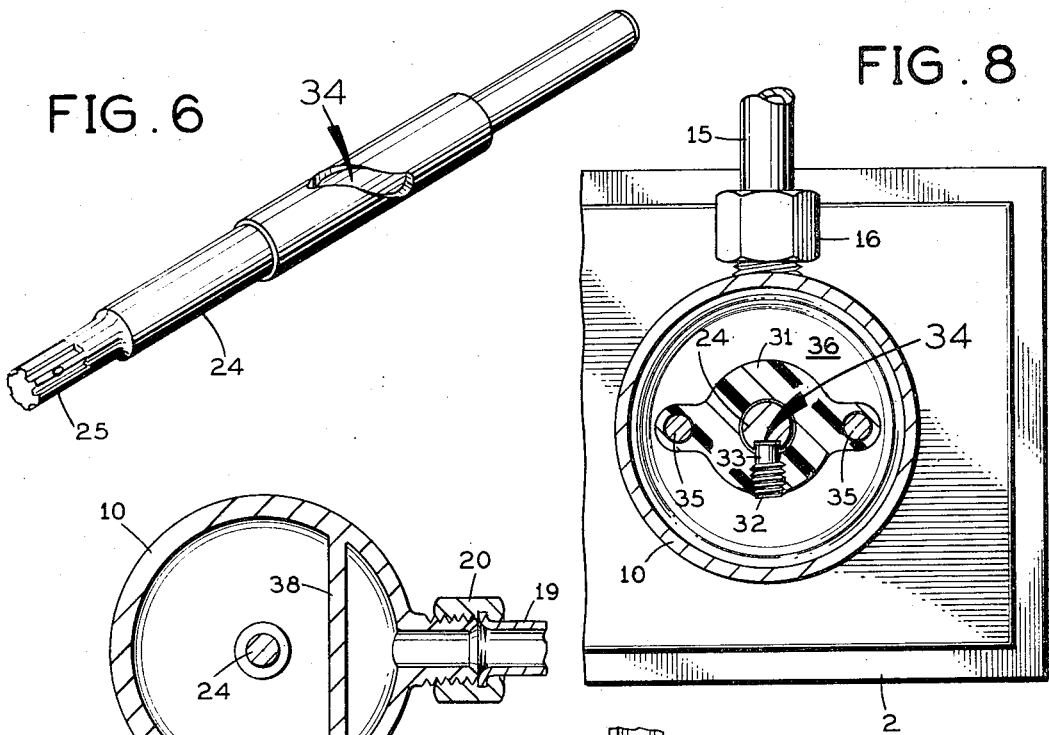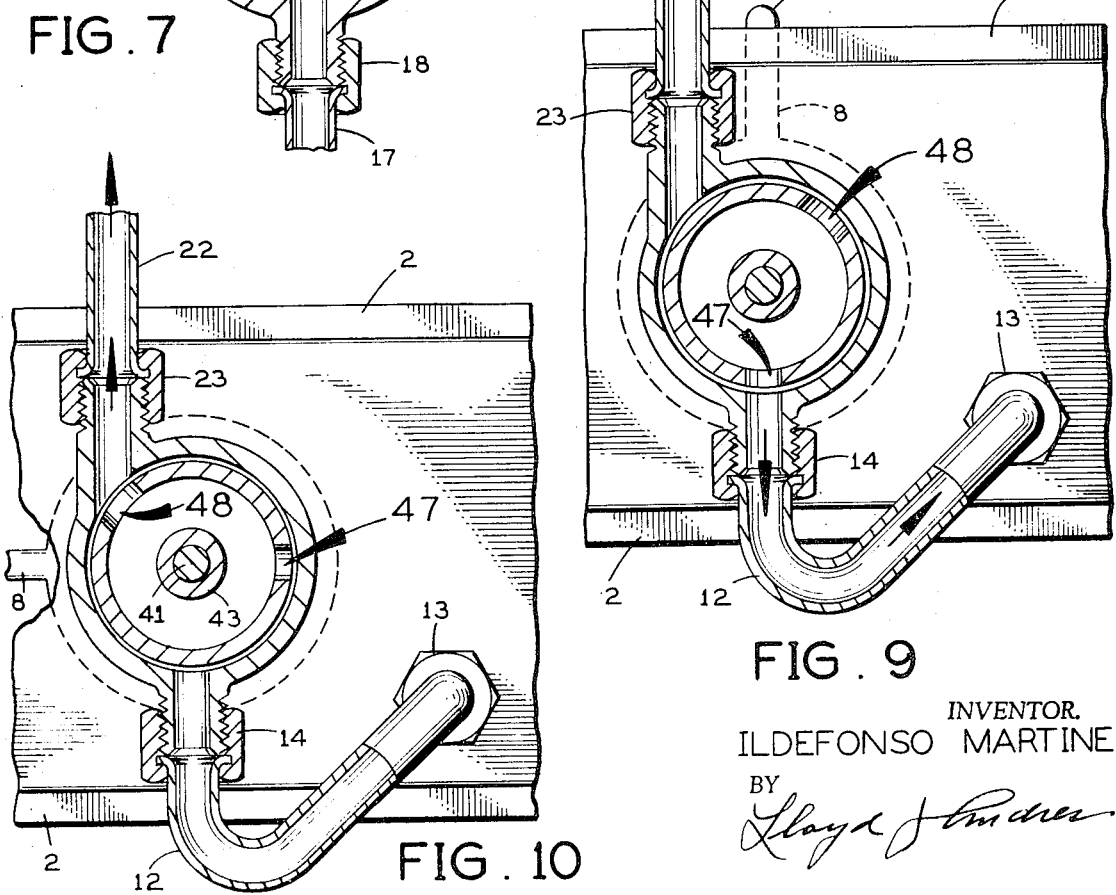

TEMPERATURE AND WATER DISTRIBUTION REGULATING MECHANISM FOR BATHTUBS AND WASHBASINS

This application is a continuation-in-part application of U.S. Ser. No. 837,762 filed June 30, 1969 now abandoned.

This invention relates in general to temperature adjustable water dispensing devices and more particularly to a device for adjusting pressurized hot and cold water mixed within a predetermined range of temperatures including a manual means for switching the water from shut-off to a tub spout or to a shower head.

Prior to this invention hot and cold water mixing valves generally were of the rotary or "Y" type, which were complex and lacked precision to be re-set and obtain successive precise predetermined mixture of hot and cold water. The reciprocating type are dependent upon coordination of complicated parallel driven independent washer type valves, such as used in ordinary faucets which require frequent replacement.

The present invention overcomes the above objections and disadvantages by the provision of reciprocation of a single plunger element driven by a single shaft for blending water through a full range of temperatures from the hot and cold water supply, and in addition incorporates a rotary distribution means for controlling the water from shut-off to the volume controlled selectivity of each of two separate outlets, such as a tub spout and a shower head.

A principal object of the invention is the precise linear movement of a single element for the delivery of cold water of certain temperatures through all intermediate temperatures to hot water of certain temperature by the simple rotation of a calibrated manual control.

Another object of the invention is the provision of a cylindrical ported valve means for selectively rotating a second lever from a shut-off position to discharge any selected volume of water within the maximum output available from a spout or a shower head.

Another object of the invention is the provision of an effective water seal of the movable control elements from the internal pressurized water by means of elastomer O-rings.

These and other objects and advantages in one embodiment of the invention are described and shown in the following specification and drawings, in which:

FIG. 6 is a perspective view of a shaft element shown in FIG. 5.

FIG. 7 is a fragmentary cross-sectional view taken through section line 7—7, FIG. 2.

FIG. 8 is a fragmentary cross-sectional view taken through section line 8—8, FIG. 4.

FIG. 9 is a fragmentary cross-sectional view taken through section line 9—9, FIG. 2.

FIG. 10 is the same as FIG. 9 in changed position.

Figure 1:
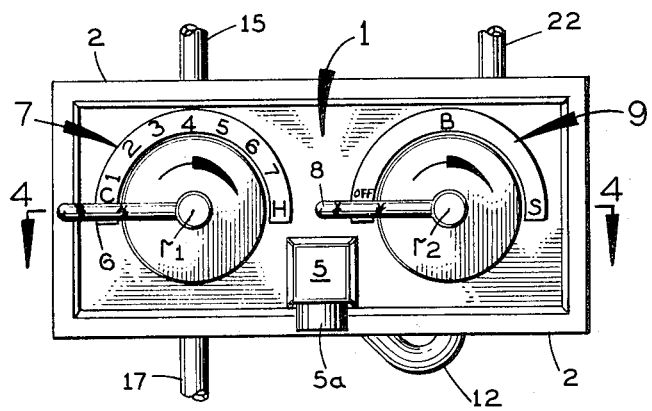
FIG. 1 is a front elevation of the device in reduced scale.
Figure 2:
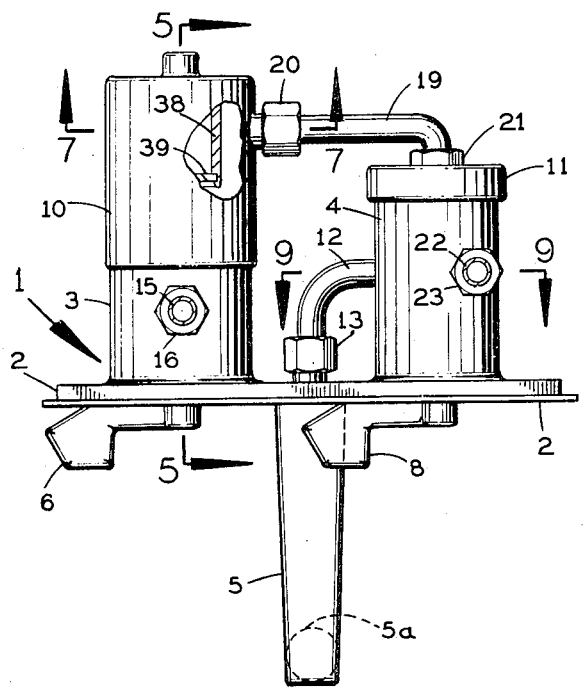
FIG. 2 is a top plan view of the device shown in FIG. 1.
Figure 3:
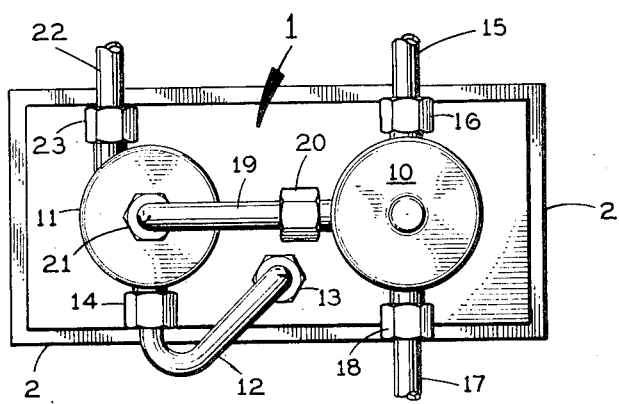
FIG. 3 is a rear elevation of the device shown in FIG. 1.

Referring to FIGS. 1, 2, and 3, a body member 1, preferably an integral die casting, comprises a combination mounting plate and escutcheon 2, a cylinder 3, an output selector and volume control cylinder 4, and a water spout 5.

A temperature selector lever 6 extends from the front of escutcheon 2 for 180° rotation about radaii $r_1$ of temperature scale 7, which scale is integral with escutcheon 2. The water selector and volume control lever 8 extends from the front of escutcheon 2 and is journalled for rotation through an angle of 180° about the radii $r_2$ of selective distribution and volume scale 9, which is also integral with escutcheon 2. The levers 6 and 8 serve as indicating arrows when considered with scales 7 and 9, respectively.

A mixing cylinder 10 is coaxially threaded and sealed by well known means to the outer end portion of cylinder 3, as shown. A cap closure 11 is threaded and sealed on the outer end of cylinder 4. One end of a communication conduit 12 is connected by coupling 13 to the inner end of spout 5 and the opposite end thereof connected to the spout outlet of cylinder 4 by a coupling 14.

Pressurized cold water is supplied by a conduit 15 through coupling 16 into the primary cylinder 3. The pressurized hot water is supplied by conduit 17 into mixing cylinder 10 by coupling 18. An outlet conduit 19 from the mixing device has one end connected by a coupling 20 to the mixing cylinder 10 and the opposite end connected by coupling 21 to cap 11, best shown in FIGS. 2 and 3. A conduit 22 terminating in a shower head or other outlet means, not shown, is connected to cylinder 4 by a coupling 23.

Figure 4:
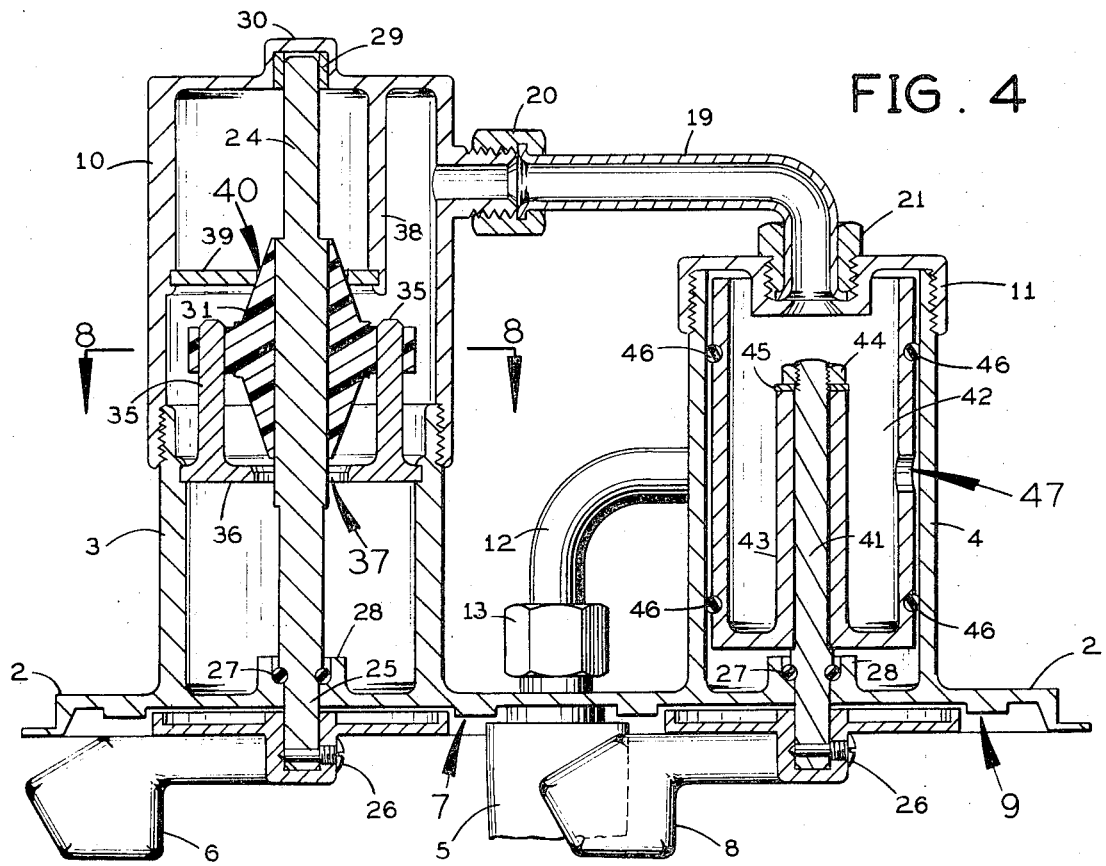
FIG. 4 is an enlarged fragmentary cross-sectional view taken through section line 4—4, FIG. 1.
Figure 5:
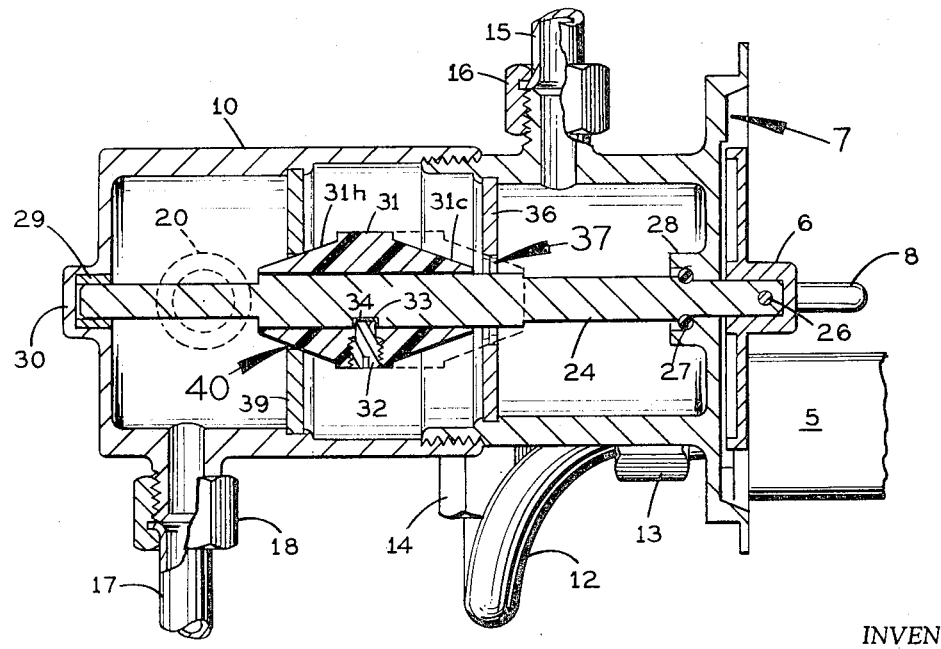
FIG. 5 is an enlarged fragmentary cross-sectional view taken through section line 5—5, FIG. 2.

Referring to FIGS. 4 and 5, a shaft 24, better shown in FIG. 6, is journalled for coaxial rotation in cylinders 3 and 10 by a front bearing portion 25 adapted to rotate in a bore through the escutcheon 2, on which projection the lever 6 is retained by a screw 26, as shown. A compression type O-ring 27 positioned between an integral collar 28 and the shaft provides a seal for confining the pressurized water within cylinder 3. The opposite end of the shaft is journalled in a cylindrical bearing 29 retained in a closed and bearing retainer 30 coaxial with cylinder 10.

A plunger 31 having like conical opposite ends has a bore therethrough coaxial with the conical ends snugly slideable on the shaft 24 and preferably made from plastic material, such as nylon or other relatively wear-resistant plastic material, with a cam follower screw 32 through one side thereof with a cam portion 33 extending from the bore of the plunger in slideable engagement with a steep helical cam groove 34, best shown in FIG. 6. The plunger 31 is also freely slideable on a pair of parallel rods 35—35 parallel with and on opposite sides of shaft 24, which rods extend from a circular compartment separator 36.

The separator 36 is sealed by well known forming means in the bore of cylinder 3 and includes a central metering bore or seat 37 therethrough of predetermined diameter coaxial with the axis of shaft 24. A wall 38 integral with cylinder 10 is parallel the shaft 24 and divides a portion of the space within the outer end portion of cylinder 10, as shown.

A transverse separator 39 normal to the axis of shaft 24 is sealed around the inner wall of the cylinder 10 and to the upper margin of wall 38. The compartment separator 39 also has a second metering bore or seat 40 therethrough like and coaxial with the seat 37 through the separator 36. The plunger 31 has a like conical shape 31c and 31h, which corresponds with the edges of the bores 40 and 37, respectively, and are coaxial therewith. It is now apparent that three compartments are formed in the cylinder assembly 3 with one adjacent the escutcheon as a cold water compartment, and the outer-most compartment forming the hot water compartment, and the central compartment forming the mixing chamber.

In operation, it is now apparent that when the shaft 24 is manually rotated by lever 6 to its left hand position, as shown in FIG. 1, the 31h end of plunger 31 will be seated in seat 40 of the separator 39, stopping the flow of hot water into the mixing chamber, which then permits the flow of cold water only therein through the bore or seat 37. When the lever 6, shown in FIG. 1, is moved to various positions in a clockwise direction, then the plunger 31 will be moved toward the separator 36 to diminish the flow of cold water and simultaneously open the hot water compartment in like proportion to provide various degrees of mixed hot and cold water until moved to its maximum clockwise direction, at which position the 31c portion of plunger 31, shown in dotted lines in FIG. 5, will be seated in seat 37 of separator 36 and thus shut off the source of cold water and permit only hot water to flow in the mixing chamber.

It is to be noted that steep screw threads on shaft 24 mated with like threads through the principal bore of the plunger 31 will function in a manner equivalent to the aforesaid described cam means and a single rod 35 is positioned sufficient to prevent rotation of the plunger during the selection operation.

It is further to be noted that the flow of water into opposite ends of the mixing chamber and including the offset path through wall 38 provides a high degree of turbulence and hence a complete blending of hot and cold water.

Referring to FIGS. 3 and 4, in order to control the flow of water from the blending device through conduit 19 or to change the rate of flow of water from the spout 5 or conduct the water from the spout into the conduit 22 and thus to a shower head or other utility outlet, not shown, and likewise control the water therethrough, a shaft 41 is journalled in escutcheon 2 on which the lever 8 is secured on the end thereof by a second screw 26 and sealed for rotation by an O-ring 27, which is positioned around the shaft and retained in collar 28 in the same manner as used on the hot-cold control shaft.

Referring to FIG. 4, the shaft 41 supports a hollow cylinder 42 positioned for close frictional rotation with the precision finished inner wall of cylinder 4 and is secured to shaft 41 by a central hub 43 retained against a shoulder on shaft 41 by a nut 44 and washer 45. Two large diameter spaced O-rings 46—46 provide an additional means for hermetically sealing the central portion of the inner cylinder 42 to prevent the possibility of leakage from the device itself, although a precision fit of metal cylinder 42 within cylinder 4 has been found sufficient to seal the spout and shower or utility outlets. An alternate material, such as nylon or similar plastic material, for cylinder 42 will provide a watertight seal with less rotational friction, and the elimination of the O-rings 46—46, which tends to offset the increased cost of cylinder 42.

Referring to FIGS. 1 and 10, when the lever 8 is in the "off" position, shown in FIG. 1, the water conducting bores 47 and 48 do not register with the bores leading to conduits 12 and 22 which conduct water to the spout 5 and output conduit 22, and therefore no water will flow into the mixing device or from the control unit.

Referring to FIG. 9, when the lever 8, shown in FIG. 1, is moved 90° to the vertical position, then the bore 47 will register with a bore leading to conduit 12 and water will flow from the spout 5.

FIG. 10 illustrates the position where the bore 48 registers with the bore coaxial with conduit 22, which stops the flow of water from bore 47 and permits a flow of water through port 48 when the lever 8 is moved 180° from its off position, as illustrated.

It is to be noted that the output volume of water from either the spout or the utility outlet may be adjusted through a wide range from off to full "on" by moving the lever 8 predetermined small degrees out of register with the 90° and 180° positions, which reduces the diameter of the passage through which the water must flow from the cylinder 4, and hence the volume of water dispensed.

This invention also comprehends certain other modifications within the teachings and scope of the above specification.

Having described my invention, I claim:

1. A mixing device for selectively combining pressurized portions of hot and cold water comprising a mounting plate member, a hollow water mixing chamber means extending from the rear side of said plate member, said chamber means having two parallel spaced transverse walls sealed therein parallel said plate member separating the space in said chamber means into a cold water compartment and a mixing compartment and a hot water compartment, one end of a low temperature water input conduit connected to said cold water compartment of said chamber means, one end of a high temperature water input conduit connected to said hot water compartment of said chamber means, one end of an output conduit connected to said water mixing compartment of said chamber means for conducting the temperature controlled water to an inlet orifice of a dispensing means, a circular cold water valve aperture of predetermined diameter through one of said walls opening into said cold water compartment coaxial with a common axis normal to said plate member, a circular hot water valve aperture of predetermined diameter through the opposite one of said walls opening into said hot water compartment coaxial with said common axis, a shaft means extending through said chamber means and each said valve aperture journalled for sealed coaxial rotation about said common axis with the front end thereof extending a predetermined distance through said plate member, a combination pointer and handle means secured to said front end of said shaft means positioned adjacent the outer side of said plate member for oscillating said shaft means through a predetermined angle about said common axis between a cold and a hot position, said shaft means having a helical cam groove of predetermined pitch therein positioned between said walls, a plunger means retained for reciprocation on said shaft means with each end thereof shaped for sealing engagement with each opposite one of said valve apertures in each opposite one of said walls when said plunger means is moved to each opposite position, a cam follower means secured in said plunger means slidably engaged in said cam groove in said shaft means for reciprocating said plunger means through its full linear range for opposite engagement with said hot and cold water valve apertures when said shaft means is oscillated by said handle means from said hot to said cold position, at least one guide pin extending from one said wall parallel said common axis and positioned through a parallel bore in one side of said plunger means for permitting the plunger means to slide thereon and prevent the rotation thereof when the said plunger means is reciprocated, a source of pressurized cold water of predetermined temperature connected to the remaining end of said cold water input conduit, a source of pressurized hot water of predetermined temperature connected to the remaining end of said hot water input conduit whereby the positioning of said handle means to its said cold position will position the said plunger means in sealed relation with said hot valve aperture and prevent the flow of hot water into said mixing compartment and simultaneously disengage said plunger means from said cold valve aperture and permit cold water to flow into said mixing chamber and through said outlet conduit and from said dispensing means and whereby any predetermined intermediate setting of said handle means between said hot position and said cold position will proportionately move said plunger means to permit predetermined proportionate flow of hot and cold water to flow from said hot and cold apertures into said mixing chamber and through said outlet conduit and from said dispensing means.

2. The construction recited in claim 1 including an index scale on the outer surface of said plate behind said combination pointer and handle means with the data of said scale positioned radial with respect to said common axis.

3. The construction recited in claim 1 with said plunger means made from plastic material and having each opposite end thereof formed in the shape of a cone with axes thereof coaxial with the said bore of the plunger means and each said valve aperture in said wall having a portion of the inner wall thereof having a divergent angle corresponding with the angle of each said cone for wear resistant sealing.

4. The construction recited in claim 1 including a selective dispensing means for pressurized water comprising a body member extending from the rear of said mounting plate member with said body member having a smooth bore therein of predetermined diameter and depth including a sealed closure over the rear open end forming a closed cylindrical rotor chamber with said inlet orifice in said cover, a first fixed outlet port of predetermined diameter through the wall of said body member and substantially central of said depth of said bore, a spout for dispensing water having an inlet and an outlet orifice, a conduit connecting said first fixed outlet port to the said inlet orifice of said spout, a second fixed outlet port of predetermined diameter through the wall of said body member displaced a predetermined radial angle from said first port with respect to said axis and substantially central of said depth of said bore, a utility outlet means for dispensing water, a conduit connecting said second fixed outlet port to said utility outlet means, a hollow cylindrical rotor with one end closed and the opposite end open and positioned for coaxial rotation within said bore with the outer peripheral wall thereof in close frictional contact with the inner peripheral wall of said bore including a drive shaft coaxial with said rotor fixed in the closed end thereof with said shaft sealed and journalled through said plate means and extending a predetermined distance from the front side thereof, a combination pointer and handle means secured to the end portion of said drive shaft adjacent and spaced from the outer side of said plate member for selectively rotating said rotor from an off position to each of a first and second dispensing position, a first rotor port through the wall of said rotor for register with said first fixed port through said body member when said rotor is rotated by said handle means through a first predetermined angle from said off position to a said first dispensing position, a second rotor port through the wall of said rotor for register with said second fixed port through said body member when said rotor is rotated by said handle means through said second predetermined angle from said off position simultaneously rotating said first rotor port out of register with said first fixed port, said output conduit of said mixing device connecting said inlet orifice, an index scale on the outer surface of said plate behind said handle means with the data of said scale radial with respect to said axis of said drive shaft whereby the water flowing from said output conduit will flow into said rotor and from said spout when said first port in said rotor is registered with said first port in said body member by the manual rotation of said handle means from said off position to said first dispensing position and whereby the movement of said handle means to said second position will register said second port in said rotor with said second port in said body member and permit water to flow from said utility outlet means and whereby predetermined angular movement of said lever means to misalign either pair of mating said ports will reduce the volume of flow proportionately.

5. In a mixing device for mixing hot and cold water comprising a means forming a hollow chamber body, said body having two parallel spaced transverse walls sealed therein with a predetermined distance therebetween separating the space in said body into a cold water compartment and a mixing compartment and a hot water compartment, a circular cold water valve seat of predetermined diameter in one of said walls opening into said cold water compartment, a circular hot water valve seat of predetermined diameter in the opposite one of said walls, said valve seats coaxially positioned about a common axis, a control shaft extending through said body and said valve seats journalled for sealed coaxial rotation in said body about said common axis with one end thereof extending a predetermined distance from one outside end of said body, handle means secured to said shaft extending from said body for annually oscillating said shaft through a predetermined angle about said common axis between a cold and a hot position, said shaft having a helical drive means thereon positioned between said walls, a plunger means retained for reciprocation on said shaft with each end thereof shaped for sealing engagement with each opposite one of said valve seats in each one of said walls when said plunger means is moved to each opposite position, helical driven means in said plunger means for reciprocating said plunger through its full linear range for opposite engagement with said hot and cold water valve seats when said shaft is oscillated by said handle means between said hot and cold positions, slidable means cooperatively related to one of said walls and said plunger means for preventing rotation thereof when reciprocated, a source of pressurized cold water at a predetermined low temperature, a source of pressurized hot water at a predetermined high temperature, a conduit connecting said source of cold water to said cold water compartment, a conduit connecting said source of hot water to said hot water compartment, a conduit connecting said mixing compartment to a dispensing device for dispensing water at a temperature corresponding to the setting of said handle means between said hot water temperature and said cold water temperature positions.

* * * * *